INVENTORS J. B. MACCHESNEY
J. F. POTTER
BY
*George S. Indig*
ATTORNEY

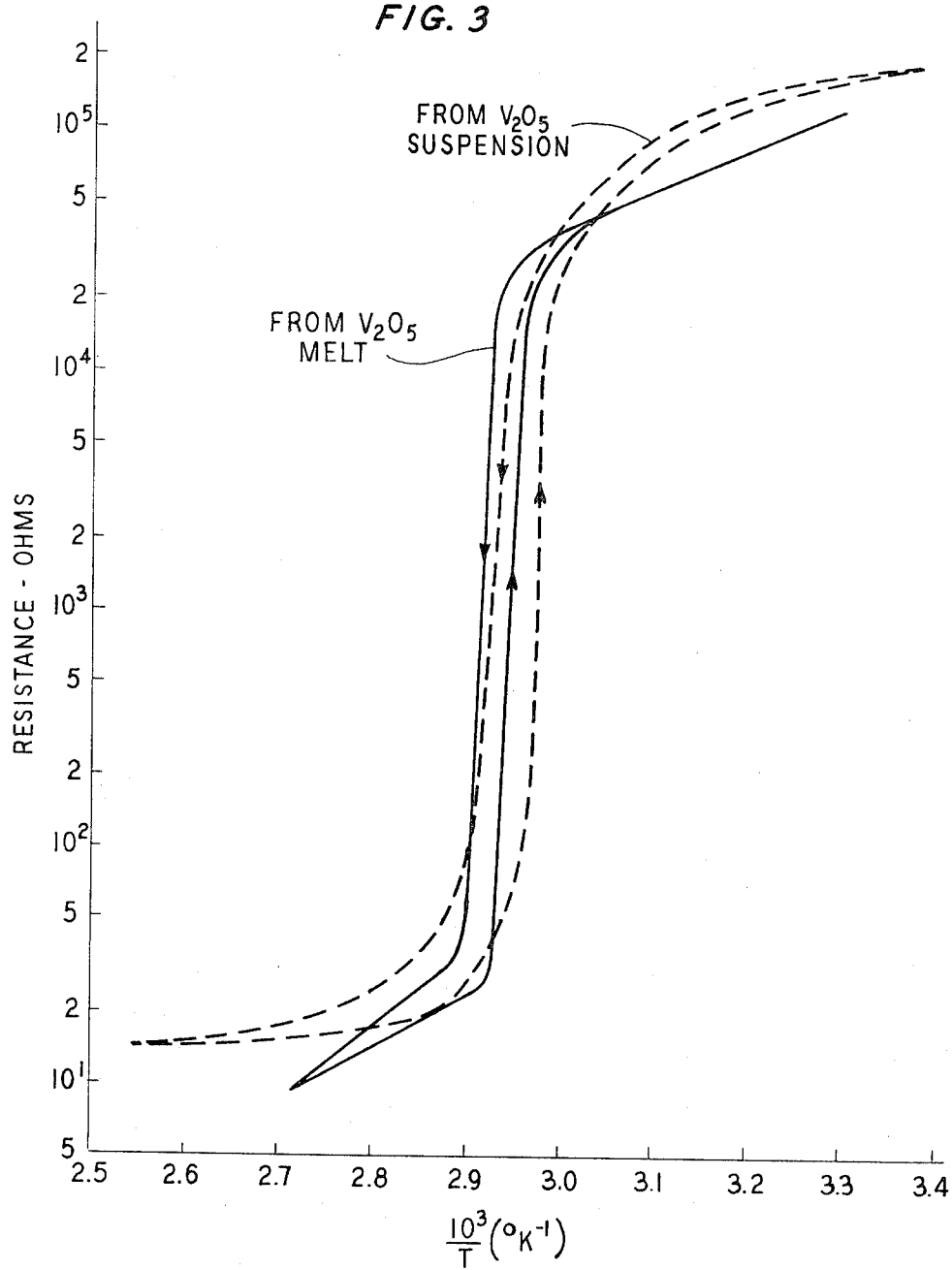

United States Patent Office 3,573,088
Patented Mar. 30, 1971

3,573,088
PREPARATION OF VANADIUM DIOXIDE
John B. MacChesney, Stirling, and John F. Potter, New Providence, N.J., assignors to Bell Telephone Laboratories, Incorporated, Murray Hill and Berkeley Heights, N.J.
Filed July 27, 1967, Ser. No. 656,419
Int. Cl. C23f 7/02
U.S. Cl. 117—62                                 1 Claim

ABSTRACT OF THE DISCLOSURE

Vanadium pentoxide can be annealed to stable vanadium dioxide at temperatures from 400 to 1200° C. under an atmosphere having an oxygen partial pressure from $10^{-4}$ to $10^{-28}$ atmospheres. This technique is applicable on vanadium pentoxide films produced by evaporating vanadyl trichloride into carbon dioxide in the presence of a substrate, or on films produced by the physical application of already formed vanadium pentoxide onto ceramic substrates.

---

This invention relates to a process for making thin films of vanadium dioxide.

BACKGROUND OF THE INVENTION

Recent interest has been shown in several materials which are able to undergo a metal-semiconductor phase transition at a characteristic temperature. Accompanying the transition are abrupt and substantial changes in various properties of the material, such as changes in its electrical resistance, light reflectance, etc. Devices which make use of these changes have been devised. Exemplary of these devices which take advantage of the abrupt change in resistance are switching devices as described in U.S. 3,149,298, issued to E. T. Handelman. Other devices, such as optical modulators and display devices, utilize the change is reflectance that occurs as the material passes through its transition temperature to modulate or alter some characteristic of impinging light.

Among the materials which possess such a phase transition characteristic are various vanadium oxides, for example, vanadium dioxide ($VO_2$). For many purposes, it is important that these materials be in a form that is compatible with the modern planar device technology that is revolutionizing the electronics field. At present, however, vanadium dioxide is provided usually as a single crystal and not in the form of a thin film for planar devices. Moreover, when some single crystals are cycled even just a few times through the transition temperature, a "fracture" phenomena occurs causing a breakdown of the material, thus imposing a limit on the useful life of any device incorporating it.

SUMMARY OF THE INVENTION

In accordance with the present invention, a method has been found for making thin film vanadium dioxide ($VO_2$) which possesses the essential phase transition property exhibited by the single crystal form and which does not suffer from deterioration upon repeated cycling. The method involves the steps of first forming thin films of $V_2O_5$ on various substrates, either by chemical vapor deposition or by application from a molten $V_2O_5$ melt or a $V_2O_5$ suspension, followed by an anneal treatment of the film under conditions of temperature and oxygen partial pressure which have now been found to favorably result in a stable existence of $VO_2$ at equilibrium.

$V_2O_5$ films prepared by chemical vapor deposition are formed by the vaporization of vanadyl trichloride ($VOCl_3$) into a carbon dioxide ($CO_2$) atmosphere, in the presence of a substrate, at temperatures between 20 and 400° C. Appropriate $V_2O_5$ coatings can also be prepared by applying already formed $V_2O_5$ to supporting bodies, such as ceramics. In either case, the anneal conditions of the invention are generally applicable to $V_2O_5$ films regardless of how formed. The anneal conditions of the invention are generally: an oxygen partial pressure between $10^{-4}$ and $10^{-28}$ atmospheres and a temperature between approximately 400 and 1200° C.

The anneal conditions of the invention are operable on films of $V_2O_5$ of the order of .1 to 200 microns in thickness, as well as on thicker films and even bulk materials.

DESCRIPTION OF THE DRAWING

The invention will be further described and particularized in the following detailed description and in conjunction with the accompanying drawing, in which:

FIG. 3 is a graph of the resistance (ohms) versus reciprocal temperature ($10^3/T$ ° $K.^{-1}$) of $VO_2$ films obtained by annealing applied $V_2O_5$ films in a $CO/CO_2$ mixture.

DETAILED DESCRIPTION

The experimental procedures followed in the course of studying the proper annealing conditions for reducing $V_2O_5$ to $VO_2$ involved the use of thin films deposited from a gaseous chemical reaction, and thicker films made by applying $V_2O_5$ to supporting surfaces. As used herein, the term "vapor deposited" $V_2O_5$ refers to $V_2O_5$ films deposited by the vaporization of vanadyl trichloride ($VOCl_3$) into a carbon dioxide ($CO_2$) atmosphere; and "applied" $V_2O_5$ refers to $V_2O_5$ which is physically applied to a substrate body. It was found that both vapor deposited and applied $V_2O_5$ could be annealed under the proper conditions of oxygen partial pressure and temperature to produce a $VO_2$ composition which exhibited the desired electronic properties.

The conditions necessary for the stable existence of $VO_2$ at equilibrium were studied in the vanadium-oxygen system under defined oxygen partial pressures. From thermodynamic considerations, it was found that temperature and oxygen partial pressure were not independently variable when both a liquid vanadium oxide phase and a solid $VO_2$ phase were present. It was further found that the relationship between the oxygen partial pressure and the temperature at equilibrium could be represented as in FIG. 1.

Figure 1:
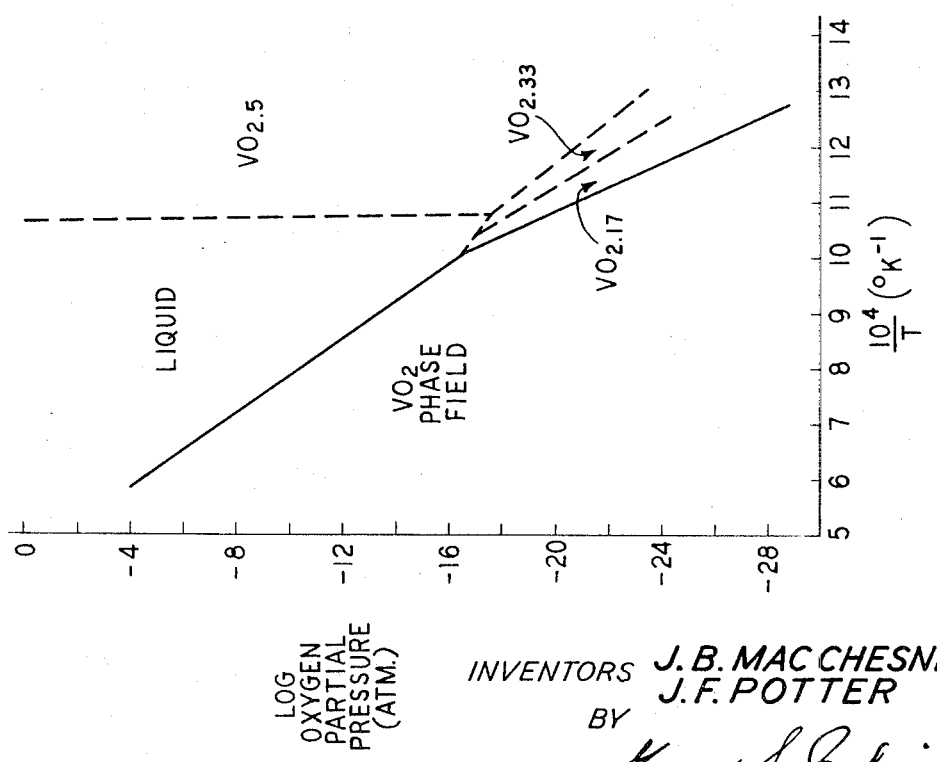
FIG. 1 is a graph showing the phase boundary between several vanadium oxides, including the desired $VO_2$, with units of log partial pressure of oxygen versus reciprocal temperature ($10^4/T$ ° $K.^{-1}$)

In FIG. 1 the phase fields of $VO_2$-liquid and $VO_2$-$VO_{2.17}$ are separated by the solid line representing the conditions necessary for the existence of these phases at equilibrium. Dashed lines are used to represent estimates of conditions giving rise to univariant equilibria involving other vanadum oxide phases and are added only to give perspective to the diagram. It is seen from FIG. 1 that a reduction in the oxygen partial pressure at fixed temperature, or an increase in the temperature at fixed oxygen partial pressure, will ultimately bring about the complete precipitation of the liquid phase as solid $VO_2$. (It is also seen that solid $VO_2$ can be obtained from solid $VO_{2.17}$ in the same manner.)

With the knowledge of the equilibrium as presented in FIG. 1, it is possible to prepare films of the $VO_2$ phase by the inventive method. The necessary temperature and oxygen partial pressure for the anneal to place the final composition of the $V_2O_5$ specimen in the $VO_2$ phase field of FIG. 1 are selected. Then the anneal is carried out in a furnace adapted to maintain appropriate mixtures of reactive gases to give, at equilibrium, the desired partial pressure of oxygen.

In order to determine if the prior processing history of the $V_2O_5$ film was important to the operability of the subsequent anneal step, two radically different procedures for making $V_2O_5$ films are employed. One procedure utilized vapor deposited $V_2O_5$ and another, applied $V_2O_5$. Although there were some minor differences in the properties of the resulting $VO_2$ films, as shown hereinafter, the results obtained clearly show that the anneal technique can be successfully applied to $V_2O_5$ films regardless of the manner in which they are made.

Vapor deposited $V_2O_5$ films were made by the following technique. Vaporization of $VOCl_3$ was carried out in an atmosphere of $CO_2$ in the presence of a heated substrate, typically of polished sapphire or fused quartz. The $VOCl_3$ vapor at its boiling point was 127° C. The gaseous reaction that occurred resulted in the deposition of $V_2O_5$ on the sapphire, which was maintained at a temperature between 60 and 120° C. The substrate was maintained at this temperature for convenience only, and no criticality in the substrate temperature within the range noted was found. Indeed, $V_2O_5$ can be produced in this manner throughout the temperature range from room temperature (20° C.) to approximately 400° C. Beyond 400° C., however, difficulty in obtaining a $V_2O_5$ product is encountered due to a poor rate of deposition found at these temperatures. In addition, films are most easily obtained this way if some small amount of water vapor is present; as little as 100 p.p.m. will suffice.

The vapor deposited $V_2O_5$ films were then annealed with various mixtures of $CO/CO_2$. With an annealing atmosphere consisting of these gases, the production of $VO_2$ was accomplished with ease within the temperature range from 450° to 550° C. The upper value represented that temperature above which some areas of the $V_2O_5$ film tended to melt and form globules on the surface of the polished sapphire. This tendency was noted for the very thin films typically produced in accordance with the vapor deposition method and is believed to be due to the lack of surface imperfections on, or roughness of, the substrate. This is borne out by the fact that films on smooth, glazed ceramic also tended to form globules, while films on porous, unglazed ceramic did not, even at higher temperatures in the 700–900° C. range. Accordingly, porosity sufficient for at least 1% by weight water absorption is preferred when anneal is conducted at high temperatures at which globule formation on smooth substrates can occur. In any event, regardless of the formation of globules, the $V_2O_5$ film was in fact brought to a $VO_2$ composition by the anneal technique.

The lower limit was chosen because at lower temperatures carbon monoxide is known to decompose into graphite and $CO_2$.

It should be understood, however, that vapor deposited $V_2O_5$ can be annealed at temperatures outside the 450–550° C. range noted with another choice of gaseous system and with a degree of surface roughness sufficient to inhibit the formation of globules.

Figure 2:
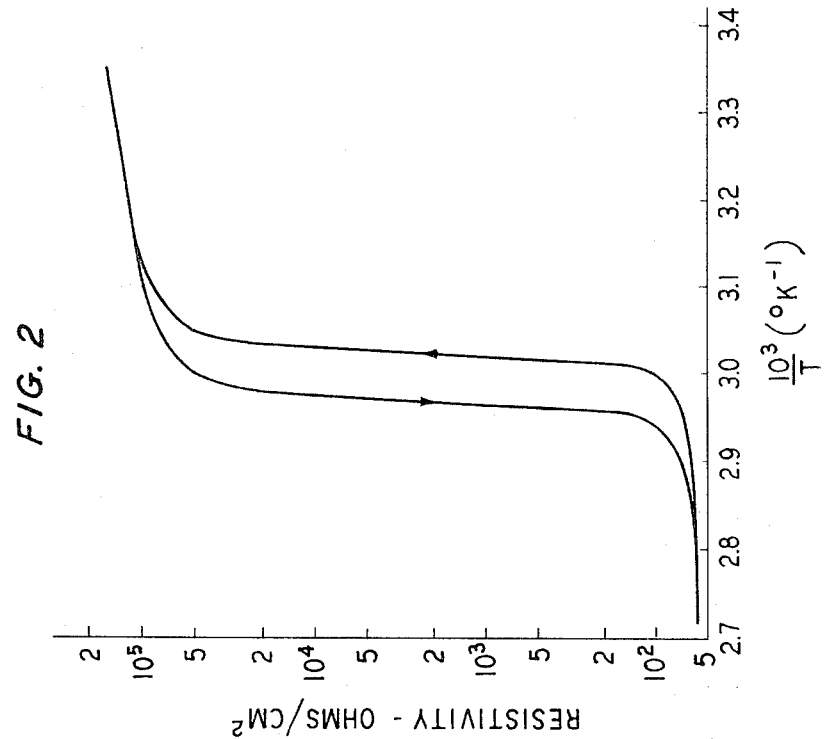
FIG. 2 is a graph of the resistivity (ohm/cm.$^2$) versus reciprocal temperature ($10^3/T$ ° $K.^{-1}$) of a $VO_2$ film prepared by vapor deposition and subsequent annealing in a $CO/CO_2$ mixture.

Utilizing this procedure, vapor deposited $V_2O_5$ films of .5 and .9 micron in thickness were made, and then annealed at 526° C. at an oxygen partial pressure of $1 \times 10^{-27}$ atmospheres (50 volume percent $CO_2$, 50 volume percent CO) for 58 and 33 minutes, respectively. The resistivity of a $VO_2$ film produced in this manner is shown in FIG. 2. It is seen from the figure that the transition takes the resistivity through a change of about 3 orders of magnitude. The hysteresis exhibited is known for the material even in other forms.

Applied $V_2O_5$ coatings on ceramic bodies were also annealed in accordance with the technique disclosed. Specimens were prepared by dipping ceramic bodies into molten $V_2O_5$ or, alternatively, into a $V_2O_5$ suspension.

The ceramics used were alumina ($Al_2O_3$) rods which were fired at the relatively low temperature of 1750° C. to produce a porous body (8 percent by weight water absorption) which was found to be ideal for the present purpose.

Coating the ceramic with molten $V_2O_5$ was accomplished by dipping it into a $V_2O_5$ melt at temperatures above 680° C. The porous nature of these rods permitted penetration of the fluid melt into the ceramic and gave rise upon cooling to a ceramic impregnated with polycrystalline $V_2O_5$. By an alternative method, $V_2O_5$ films were prepared by dipping ceramics into a slurry consisting essentially of ground $V_2O_5$ suspended in a solution of ¼ weight percent jaguar gum in water. No criticality was found in the amount of gum required, and more or less viscous suspensions, if desired, could be employed; the concentration of $V_2O_5$ also was not found to be critical but for convenience, 10–50% weight percent $V_2O_5$ suspensions were used.

Subsequently, the coated ceramics made by both processes, were transferred to a furnace whose atmosphere was controlled by appropriate mixtures of $CO_2$ and CO. There they were annealed under conditions sufficient to reduce the $V_2O_5$ to $VO_2$. The anneal conditions used, of course, were generally in the $VO_2$ phase field of FIG. 1.

In the case of the ceramic coated with the $V_2O_5$ suspension, the particulate $V_2O_5$ first had to be melted in situ to improve film adherence. This was easily accomplished by maintaining the anneal temperature above 650° C. If desired, melting in situ could be carried out before anneal, in which case the anneal subsequently used would be within the broad range of from 400–1200° C.

The following examples set forth the typical procedures followed in the preparation of a $VO_2$ coated ceramic.

Example I $Al_2O_3$ ceramic rods, prepared as described above, were dipped in molten $V_2O_5$ at 680° C., and dried in air. The average surface density of a $V_2O_5$ coating was 0.039 gram/cm.$^2$, and its approximate thickness was 108 microns. The coated ceramic was annealed at 779° C. in an atmosphere having a partial pressure of oxygen of $4 \times 10^{-20}$ atm. (50 volume percent $CO_2$, 50 volume percent CO) for 30 minutes. The electrical resistance of the annealed film as a function of reciprocal temperature is indicated in FIG. 3. It is evident from FIG. 3 that the resulting film exhibited the requisite transition phenomenon.

Example II

The $Al_2O_3$ rods were dipped in a slurry consisting essentially of 23 weight percent milled $V_2O_5$ in a ¼ weight percent solution of jaguar gum in water. The coated rods were then annealed at 830° C. with an oxygen partial pressure of $2 \times 10^{-20}$ atm. (80 volume percent $CO_2$ and 20 volume percent CO) for about 15 minutes. Adherent coatings were formed by the initial melting of $V_2O_5$ on the rod, rapidly followed by reduction to $VO_2$. The electrical resistance of the annealed film as a function of reciprocal temperature is indicated in FIG. 3. It is evident from FIG. 3 that the resulting film, as did that produced in accordance with the method of Example I, exhibited the requisite transition phenomenon.

Because of the porosity of the ceramic substrate used, the $V_2O_5$ melt impregnated the ceramic and made it unlikely that the $V_2O_5$ was reduced to $VO_2$ throughout the entire thickness of the film. That is to say, the film obtained on the ceramic subsequent to annealing was a composite of several oxide states of vanadium. Nonetheless, X-ray diffraction tests showed that the uppermost material is $VO_2$ and, as FIG. 3 indicates, the coating as a whole had the electronic properties of $VO_2$ insofar as the transition phenomenon was concerned. Conversion of the entire coating to $VO_2$ may be accomplished, if desired at longer anneal times.

It should be noted that any $Al_2O_3$ that went into solution in the molten $V_2O_5$ did not affect the electronic properties of the resulting annealed film. Specimens prepared from a melt saturated with $Al_2O_3$ had the same properties as those prepared from uncontaminated $V_2O_5$.

The annealing sequences described above were in terms of mixtures of $CO_2/CO$. It is stressed, however, that other suitable systems for maintaining the necessary partial pressure of oxygen to effect ultimate anneal can be employed.

The invention has been described with reference to particular embodiments and examples thereof, but it is intended that variations therefrom which basically rely on the teachings of the invention are to be considered as within the scope of the description and the appended claim.

What is claimed is:

1. A method for making $VO_2$ films comprising the step of heating a film of a composition consisting essentially of $V_2O_5$ to an anneal temperature from 400 to 1200° C., in an atmosphere having an oxygen pressure from $10^{-4}$ to $10^{-28}$ atm., characterized in that the said oxygen pressure is derived from the equilibrium partial pressure of oxygen in a mixture of $CO_2$ and $CO$, where oxygen is liberated from the equilibrium between these two gases and wherein such temperature and partial pressure result in the stable existence of $VO_2$.

References Cited

UNITED STATES PATENTS

| | | | |
|---|---|---|---|
| 3,042,822 | 7/1962 | Savage et al. | 117—228(X) |
| 3,455,724 | 7/1969 | Teeg et al. | 117—62 |

OTHER REFERENCES

Powell, Oxley, Blocher, Vapor Deposition, John Wiley & Sons, Inc., New York, pp. 384–386, 402 (1966).

ALFRED L. LEAVITT, Primary Examiner

W. F. BALL, Assistant Examiner

U.S. Cl. X.R.

117—35, 62, 106